United States Patent [19]

Turk et al.

[11] Patent Number: 5,464,651
[45] Date of Patent: Nov. 7, 1995

[54] PHOSPHORS, COMPOSITIONS CONTAINING SUCH PHOSPHORS AND METHODS OF USE

[75] Inventors: Richard Turk, East Lansing; Paul Nowaczyk, Howell, both of Mich.

[73] Assignee: Michigan Biotechnology Institute, Lansing, Mich.

[21] Appl. No.: 154,230

[22] Filed: Nov. 18, 1993

[51] Int. Cl.$^6$ .................................................. B05D 5/06
[52] U.S. Cl. ........................... 427/64; 427/65; 427/66; 427/67; 427/68; 427/157; 427/385.5
[58] Field of Search .................... 427/64–68, 157, 427/385.5; 252/301.16

[56] References Cited

U.S. PATENT DOCUMENTS

| | | | |
|---|---|---|---|
| 3,015,567 | 1/1962 | Hause | 99/143 |
| 3,993,795 | 11/1976 | Mauron | 426/618 |
| 3,998,943 | 12/1976 | Ullman | 424/12 |
| 4,064,138 | 12/1977 | Saari et al. | 548/344 |
| 4,399,090 | 8/1983 | Sprangers | 427/64 |
| 4,780,376 | 10/1988 | Nakamura | 428/691 |
| 5,003,182 | 3/1992 | Umemoto et al. | 250/484.1 |
| 5,229,161 | 7/1993 | Turk | 426/649 |

OTHER PUBLICATIONS

Bredol, Michael, et al., "Designing Luminescent Materials," Adv. Mater. 3 (1991) No. 78, pp. 361–367. (no mo.).

*Primary Examiner*—Janyce Bell
*Attorney, Agent, or Firm*—Quarles & Brady

[57] ABSTRACT

The present invention relates to phosphors, composition containing phosphors and methods of their use. More particularly, it relates to organic phosphors which are amino acid salts compositions containing the phosphors and methods of using those phosphors and compositions to make objects photo-luminescent.

4 Claims, No Drawings

PHOSPHORS, COMPOSITIONS CONTAINING SUCH PHOSPHORS AND METHODS OF USE

FIELD OF THE INVENTION

The present invention relates to phosphors, compositions containing phosphors and methods for their use. More particularly, it relates to organic phosphors which are amino acid salts, compositions containing the phosphors and methods of using those phosphors and compositions to make objects photo-luminescent.

BACKGROUND OF THE INVENTION

Photo-luminescence is a spectral property of materials and is defined as the emission of light on exposure to invisible radiation or light of a different wavelength. Light energy which is absorbed by a crystal is normally lost in the internal vibrations of the crystal lattice. Luminescent materials which store the light energy and then reemit light at a lower energy are called phosphors. Most phosphors are excited with high energy photons in the UV region of the electromagnetic spectrum or by electrons from X-ray sources. The distinction between a fluorescent and phosphorescent material or phosphor is based on the time scale of the emission process. Materials which emit light on the scale of less than 1 microsecond are termed fluorescent. Phosphors emit light after the excitation source is turned off. This light may continue from tens of microseconds to several minutes.

Phosphors are used in a variety of applications, such as fluorescent lights, cathode ray and television screens, computer display devices, x-ray intensifying screens, brighteners in textiles and paper, and in phosphorescent analysis equipment.

Most phosphors are inorganic solids prepared from a metal cation, a nonmetal anion and an activator. The activator is usually a transition or a rare earth element which when added in small amounts (0.1% to 5%) can alter the color of the emitted light. For example, zinc sulfide (ZnS) can be activated with copper to give a blue-green emitting phosphor with a short lifetime of 35 microseconds. If copper is replaced with silver in the zinc sulfide lattice the emitted color is shifted to blue with a similar lifetime. Addition of the element cadmium (Cd) to ZnS:Ag increases the wavelength to green and extends the lifetime to 200 microseconds. The inorganic phosphor $ZnCdS_2$:Ag can actually be tuned in color by varying the Cd level from blue (no Cd) to red (high Cd).

Unfortunately, most of the phosphors currently in use are toxic and cannot be used in many applications. A need exists for phosphors and phosphor containing compositions that are non-toxic or which do not have the other disadvantages of the phosphors that are currently available for use.

BRIEF SUMMARY OF THE INVENTION

It is an object of the present invention to disclose organic phosphors and compositions containing such phosphors.

It also is an object to disclose methods of employing those compounds and compositions to make objects phosphorescent.

I have now discovered that certain amino acid and dicarboxylic acid salts and mixtures are phosphors which display an unexpected photo-luminescence when viewed under ultraviolet (UV) and fluorescent lights.

The amino acid salts may be represented by the following formula:

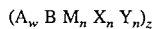

in which A is a basic amino acid, such as lysine or ornithine; B is carbonic acid, oxalic acid or a saturated linear di- or tricarboxylic acid of the structure:

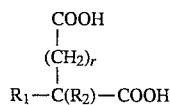

in which r is 0 to 10, $R_1$ is H, OH or $NH_2$, $R_2$ is H, OH, $CH_2COOH$, or $CH_2(OH)COOH$; w is 1 or 2; n is 0, 1 or 2 and the various n's may be the same or different; M is hydrogen or a metal selected from the Periodic Group IA, such as Li, Na or K, or a metal selected from the Periodic Group IIA, including Mg, Ca, Sr, or Ba, or a metal from Periodic Group IIB, including Zn, and when there are two M's they can be the same or different; X is a halogen, such as chlorine (Cl) or fluorine (F) or iodine (I); Y is hydroxyl (OH) and Y>X; and z is 1 to 16 formula units.

When r is not zero then B is a saturated linear dicarboxylic acid, such as succinic, glutaric adipic, pimelic, malic, glutamic or aspartic acid. When r is zero the B may be a saturated linear dicarboxylic acid such as malonic acid or a saturated linear tricarboxylic acid, such as citric or isocitric acid.

This convention for ionic compounds indicates that the compound can be made in a manner consistent with the molar ratio of its component ingredients. The number of formula units is typically between 1 and 16 and represents the addition of 1 to 32 molecules of amino acid. Each of the formula units consists of an amino acid and a dicarboxylic acid in the molar ratio of 1 to 1 or 2 to 1.

One of the salts, dilysine succinate, emits a blue light with a lifetime of 3–5 seconds. Emission occurs after excitation with short-wave ultraviolet (SWUV) of about 230 nm to about 340 nm or long-wave ultraviolet (LWUV) light of about 340 nm to about 405 nm, and preferably about 366 nm. An "activation" process has been found for the amino acids salts in which the intensity of the phosphorescence is increased and the wavelength of the emitted light can be tuned from blue to green. The phosphorescence spectra of (L-lysine) (succinic acid)Mg(OH)$_2$ emits at a maximum of 484 nm (blue-green) and (L-lysine)(succinic acid) (Zn(OH)$_2$) emits at 497 nm (green). Both phosphors have a lifetime of 10–15 seconds. Significant emission is visualized under excitation with SWUV, LWUV, fluorescent and incandescent lighting. The high intensity of sample (L-lysine) (succinic acid)Mg(OH)$_2$ is due to the presence of Mg in the lysine succinate salt. The emission is shifted to higher wavelengths in (L-lysine) (succinic acid)(Zn(OH)$_2$) by substituting zinc for magnesium.

Some of the amino acid salts that possess photo-luminescence are described in my U.S. Pat. No. 5,229,161, "Metal Free and Low Metal Salt Substitutes Containing Lysine". Both the organic components of the salt substitutes, lysine and succinic acid, are also the components for the preferred organic salt phosphors.

The presently preferred amino acid salt phosphor is the salt, lysine succinate, which contains L-lysine and succinic acid in the molar ratio of 1:1. However, dilysine succinate (ratio 2:1) also is useful.

A salt can be prepared with a minimum of 1 metal atom per 32 amino acid molecules when z is 16. A salt can be prepared with a maximum of 32 metal atoms per 32 amino acid molecules when z is 16.

The basic amino acid, such as lysine, can be used in its monohydrate form or preferably as a mixture of the monohydrate and the monohydrochloride. The amino acid can be used as either its L or D isomer without altering the properties of the phosphor.

The dicarboxylic acids, such as succinic acid, can be used in their acid form or as a metal salt. The metal ions (M) of the salts can be selected from Periodic Groups IA, IIA including Mg, Ca, Sr, Ba, or IIB including Zn. These metals can be added as the metal oxide such as CaO, MgO, ZnO, as the metal carbonate, $CaCO_3$, $MgCO_3$, or as the metal dicarboxylic acid such as calcium succinate, magnesium succinate, or zinc succinate. The ions of IIA and IIB metals can be added together and used to tune the emitted wavelength.

The inorganic anions will normally be hydroxide ions (OH). Halide ions, $Cl^-$, $I^-$ or $F^-$ (X) can be included in the composition. A minimum of one halide ion can be added to the formula per 32 amino acid molecules when z is 16. The molar concentration of hydroxide ions (Y) is preferably greater than or equal to the molar concentration of halide ions (X).

It has also been determined that during the drying of the salts, various states of hydration may occur. The ingredients lysine monohydrochloride, lysine monohydrate, and sodium succinate, all exist as hydrates. It has been found that the number of waters of hydration present depends on the number of chlorine atoms, sodium ions and succinic acid molecules in the formula unit. There may be 1 to 3 water molecules of hydration per formula unit.

The salt phosphors of the present invention can be obtained from a saturated solution and processed in either a microwave oven or by conventional convection drying. The addition of polymers, such as polyacrylic acid or polycaprolactone, which have melting temperatures below the melting point of the salt phosphor produce phosphorescent films which are insoluble in water and less hygroscopic.

The scope of this invention also includes the use of mixtures of the amino acids and dicarboxylic acids, as well as, polymers with properties similar to the monomer components. For example, polylysine can be substituted for lysine and polyacrylic acid can be substituted for succinic acid.

The organic phosphors of the present invention possess several distinct advantages over currently available phosphors. They include the following:

(a) Few of the currently available phosphors are considered non-toxic. As a result, no phosphors are presently used in foods. Organic phosphors can be made in which all the components are food grade chemicals. A food grade phosphor could be used as either a direct or indirect food additive. Food packaging with phosphors incorporated into the polymer or added directly to the food could monitor products for spoilage. Novelty foods could be produced with "glow in the dark" appeal.

(b) Inorganic phosphors require electronic grade purity of components (>99.9%) and are usually prepared under extreme temperatures (>900° C.). The organic phosphors are prepared from food grade or analytical grade purity (>98%) and can be processed in a microwave. Microwave temperatures never exceed 200° C. which is higher than the melting points of the organic phosphor salts.

(c) Due to their crystalline structure and high temperature of melting, the inorganic phosphors require special processing methods in order to produce thin films. Thin films are important in the electronics industry for semiconductor and television screen technologies. The organic phosphors which are amino acid salts are water soluble and thin films can be produced in a microwave oven. Since a gel/glass structure is formed other shapes can be produced such as semitransparent solid blocks or long glass-like threads. Although the material is hygroscopic and loses its phosphorescence upon absorbing water, non-polar additives or encapsulation methods can also be used for protection.

(d) Most of the rare earth elements used in the manufacture of inorganic phosphors are as expensive as the precious metals gold and platinum. All components of the phosphors of the present invention are available as inexpensive food/feed grade chemicals which do not require special purity. These materials also can be derived from renewable agricultural resources and are biodegradable. The availability, safety, and biodegradability of these phosphors can have advantages in several potential applications in the food, pharmaceutical, and environmental monitoring industries.

The methods of the present invention for using the phosphors to make objects phosphorescent include methods of irradiating the phosphors to cause phosphorescence, methods for incorporating the phosphors into an object, and methods for applying a film-forming composition, such as a phosphor containing paint or ink, to the external surface of the object. A composition particularly useful for the latter method comprises an organic phosphors encapsulated in a transparent, water insoluble polymerm such as polyvinylchloride or gelatin, dissolved in a water-based paint or ink vehicle.

The foregoing and other advantages of the present invention will become apparent to those skilled in the art from the description of the preferred embodiments.

DESCRIPTION OF THE PREFERRED EMBODIMENTS

The preferred phosphors are salts containing L-lysine and succinic acid in the molar ratios of 1:1 and 2:1. They may conveniently be prepared by dissolving L-lysine monohydrate in water and adding succinic acid to the solution. The solution is dried in an oven until solids begin to form when the solution is cooled to room temperature. If desired, the solids can be ground to obtain a free-flowing powder which can be combined with other ingredients at time of use to form compositions which can be painted or coated onto objects to make those objects phosphorescent when exposed to light, such as UV light or fluorescent light.

The following examples illustrate the preparation of the phosphors of the present invention:

EXAMPLE 1

Preparation of Lysine Succinate (1:1)

10 grams of L-lysine monohydrate are dissolved in 25 ml of water. 7.2 grams of succinic acid is added and dissolved. The solution is then dried in a 110° C. oven until solids begin to form when cooled to room temperature. After 15 to 30 minutes solids form at room temperature and are collected.

EXAMPLE 2

Preparation of Dilysine Succinate (2:1)

The procedure of Example 1 is repeated using 10 gms of L-lysine monohydrate.

EXAMPLE 3

Preparation of Sodium Dilysine Succinate Hydrochloride (2:1:1:1)

12 grams of L-lysine monohydrate is dissolved in 20 ml of water to which 6.0 ml of concentrated hydrochloric acid has been added. 2.964 grams of disodium succinate is added to neutralize some of the excess hydrochloric acid and 2.16 grams of succinic acid are added with mixing until effervescence ceases and all solids are dissolved. The solution is dried in a 110° C. oven until solids begin to form when cooled to room temperature. After 15 to 30 minutes solids form and are collected.

EXAMPLE 4

Preparation of Magnesium-Containing Phosphor

Dissolve 10.0 grams of lysine monohydrate in 10 ml of hot water (60° C.). Add 11.1 grams of lysine monohydrochloride and 17.1 grams of magnesium succinate and bring to a boil for 5 minutes. Approximately 10 grams of the solution is dried in a microwave oven for 2 minutes (100% power) and then cooled in a freezer for 5 minutes. The dry solid gives a bright blue-green phosphorescence when excited under long wave UV light with a lifetime of 15–20 seconds.

EXAMPLE 5

Preparation of Zinc-Containing Phosphor

Dissolve 10.0 grams of lysine monohydrate in 10 ml of hot water (60° C.). Add 11.1 grams of lysine monohydrochloride, 14.4 grams of succinic acid, and 9.9 grams of zinc oxide and bring to a boil for 5 minutes. Approximately 10 grams of the solution is dried in a microwave oven for 2 minutes (100% power) and then cooled in a freezer for 5 minutes. The dry solid gives a bright green phosphorescence when excited under long wave UV light with a lifetime of 15–20 seconds.

EXAMPLE 6

Preparation of Zinc-Containing Phosphor Film

Dissolve 10 grams of lysine monohydrate in 10 ml of hot water. Add 7.18 grams of succinic acid, and 4.95 grams of zinc oxide and bring to a boil for 5 minutes. This material when cooled gives a clear highly viscous gel which can be coated on surfaces. Approximately 1.0 gram of gel coating is dried in a microwave oven for 1 minute (100% power) and cooled in a freezer. The dried film gives a bright green phosphorescence when excited under long-wave UV light with a lifetime of 5–10 seconds.

EXAMPLE 7

Preparation of Zinc and Sulfur-Containing Phosphor

Dissolve 20.0 grams (0.122 moles) of lysine monohydrate in 10 ml of hot water (60° C.). Add 14.4 grams (0.122 moles) of succinic acid, 9.9 grams (0.122 moles) of zinc oxide, and 7.92 grams (0.045 moles) of 1-cysteine hydrochloride hydrate and bring to a boil for 5 minutes. This material when cooled gives a clear highly viscous gel which can be coated on paper surfaces. Approximately 10 grams of the gel coating is dried in a microwave oven for 2 minutes (100% power) and then cooled in a freezer for 5 minutes. The dry solid gives a bright green-yellow phosphorescence when excited under long-wave UV light with a lifetime of 5–10 seconds.

The above examples are illustrative and salts containing the same ingredients in the other molar ratios can be prepared by the or other known same procedures.

Representative of the phosphors of the present invention are the following:

((L-lysine) (succinic acid) Mg(OH)2);
((L-lysine) (succinic acid) Zn(OH)2);
((L-lysine) (succinic acid) Ca(OH)2);
((L-lysine) (adipic acid) CaCl(OH);
((L-lysine) (L-malic acid) Mg(OH$_2$));
((L-lysine) (suberic acid) ZnCl(OH);
((L-lysine) (L-aspartic acid) Mg(OH$_2$);
((L-ornithine) (succinic acid) Mg(OH$_2$);
((L-ornithine) (succinic acid) Zn(OH$_2$);
((L-ornithine) (succinic acid) Ca(OH$_2$);
((L-ornithine) (adipic acid) CaCl(OH);
((L-ornithine) (L-malic acid) Mg(OH$_2$);
((L-ornithine) (suberic acid) ZnCl (OH); and
((L-ornithine) (L-aspartic acid) Mg (OH)$_2$.

All of the ingredients used in preparing the phosphors of the present invention are readily available.

Presently all the amino acids are commercially available. The lysine monohydrate and the lysine hydrochloride are available from various sources (such as Ajinomoto, Degussa, ADM and Bio Kyowa, Inc.)

The dicarboxylic acids, including succinic acid, also are available from numerous sources. The preferred acid, succinic acid, can be synthesized from maleic anhydride or prepared by fermentation. It is approved as a food additive in relishes and condiments. It has a limited application as a food acidulant but is not as widely used as citric, lactic, malic, and fumaric acids. Succinic acid also has been used as an additive in various fermented foods such as soy, soy paste and sake.

It will be readily apparent to those skilled in the art that a number of modifications and changes can be made without departing from the spirit and scope of the invention. Therefore, it is intended that the invention only be limited by the claims.

We claim:

1. A method for making an object photo-luminescent which comprises applying to the object a phosphor of the formula:

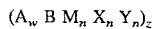

$(A_w \ B \ M_n \ X_n \ Y_n)_z$ in which A is a basic amino acid; B is carbonic acid, oxalic acid or a saturated linear di- or tricarboxylic acid of the structure;

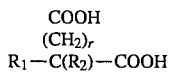

in which r is 0 to 10, $R_1$ is H, OH or $NH_2$, $R_2$ is H, OH, $CH_2COOH$ or $CH_2(OH)COOH$; w is 1 or 2; n is 0, 1 or 2 and the various n's may be the same or different; M is hydrogen or a metal selected from the Periodic Group IA, or Periodic Group IIA, or Periodic Group IIB, and when there are two M's they can be the same or different; X is a halogen; Y is hydroxyl and Y>X; and z is 1 to 16 formula units; so that the phosphor can be activated to make the object photo-luminescent.

2. A method of claim 1 in which the phosphor is a salt of lysine and succinic acid.

3. A method of claim 1 in which the phosphor is combined with ingredients from which an outer layer on the object is to be formed and then an outer layer is applied to the object.

4. A method of claim 1 in which the phosphor is combined with film forming ingredients to form a film forming composition and the film forming composition is applied to the external surface of the object.

* * * * *